March 11, 1969     T. C. J. L. STAAR     3,432,170
RECORD CHANGING APPARATUS
Filed May 18, 1966
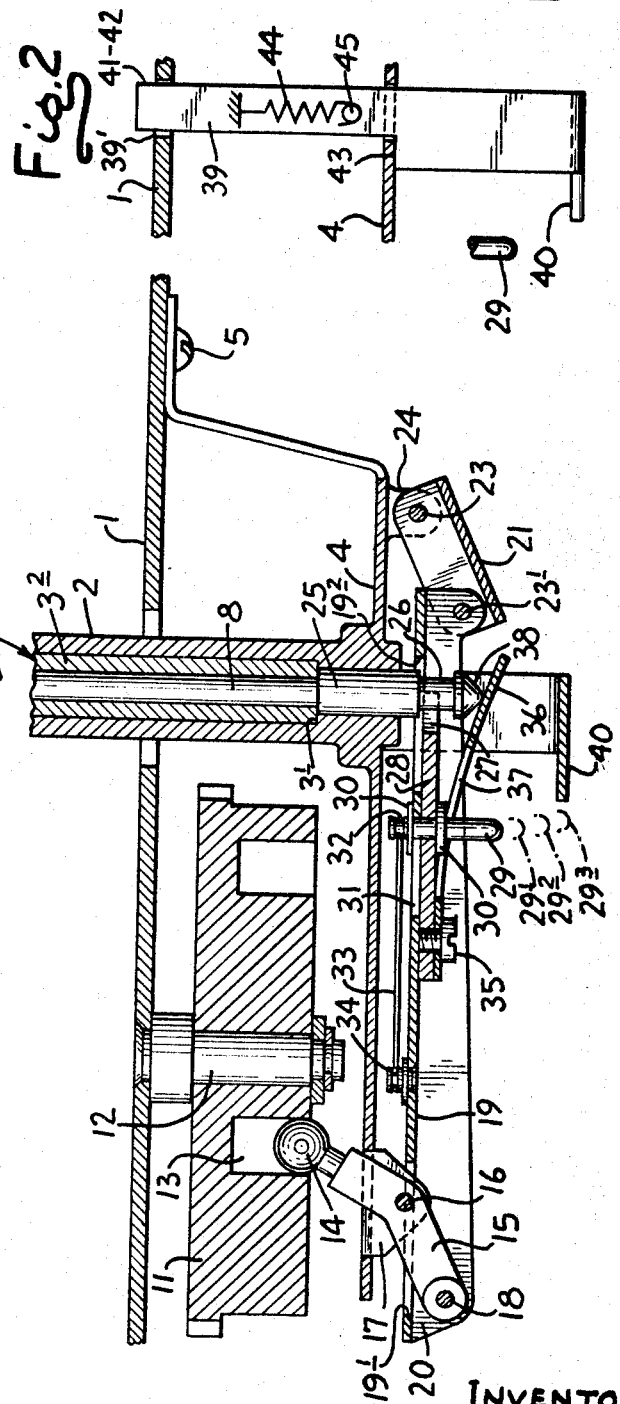
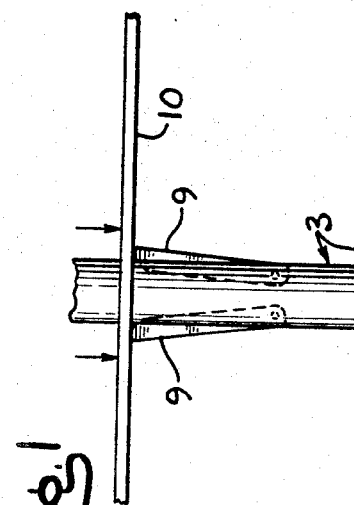
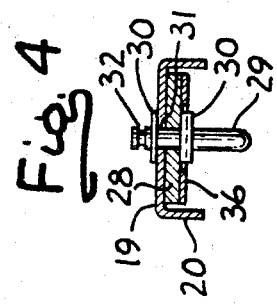
INVENTOR
THEOPHIEL CLEMENT JOZEF LODEWIJK STAAR
by: Wolfe, Hubbard, Voit & Osann
ATTYS.

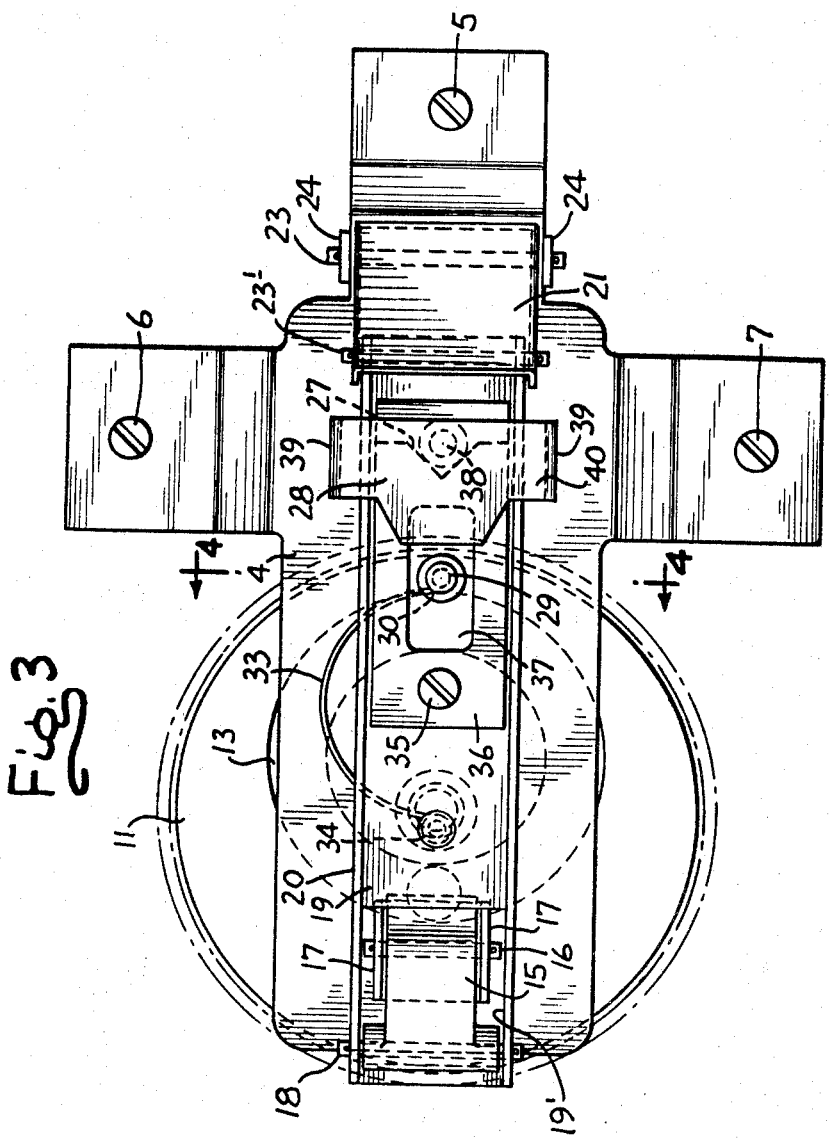

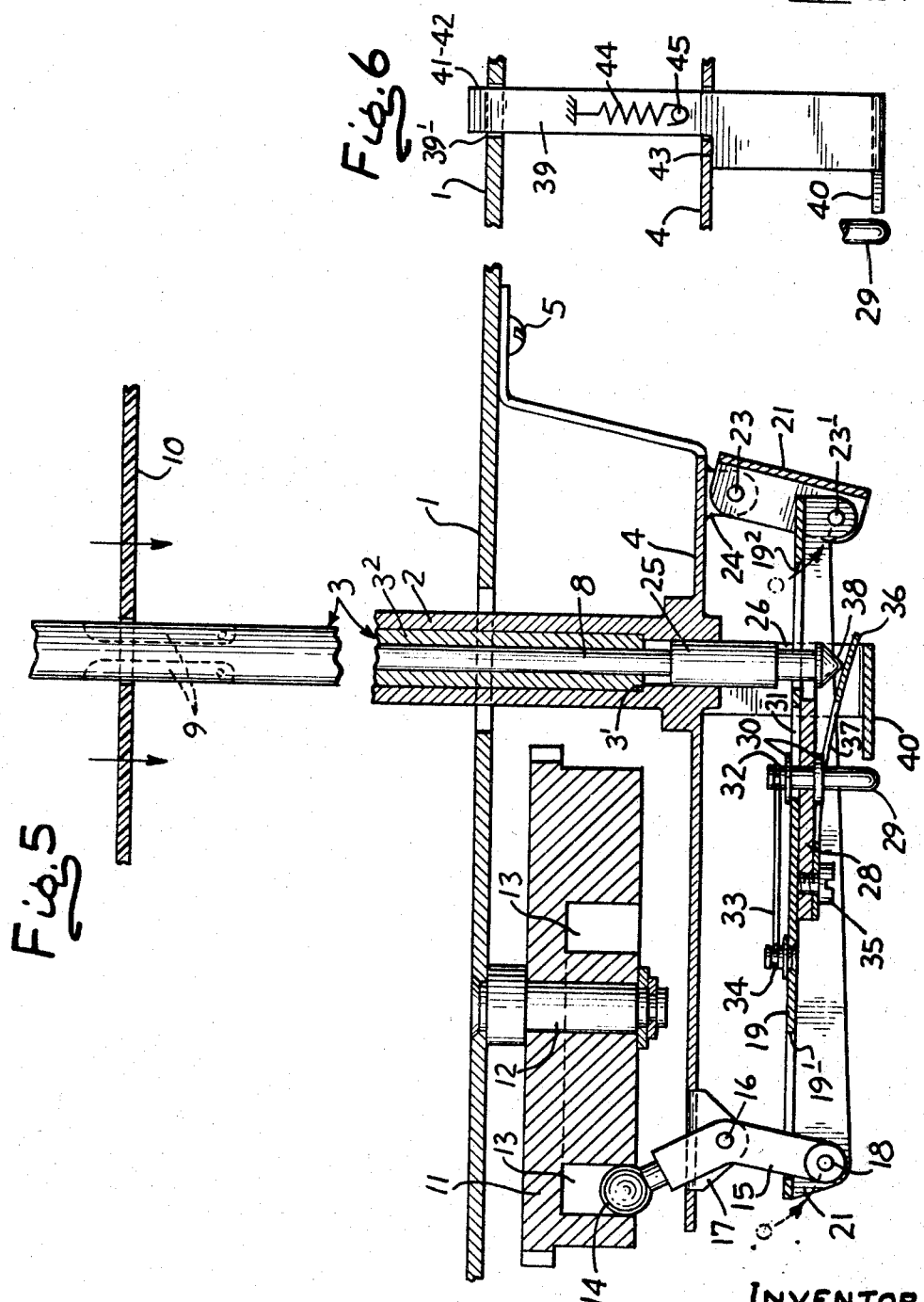

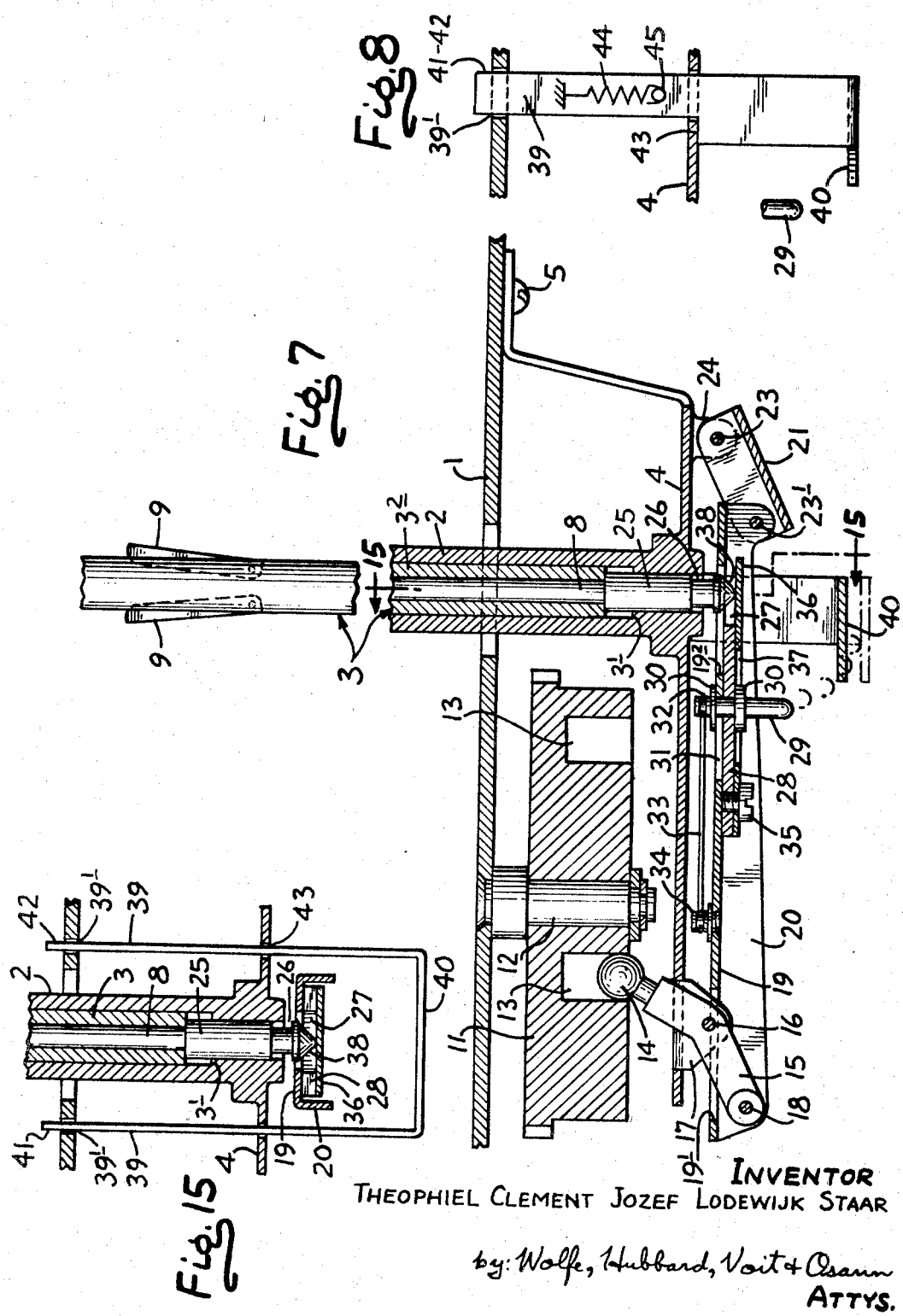

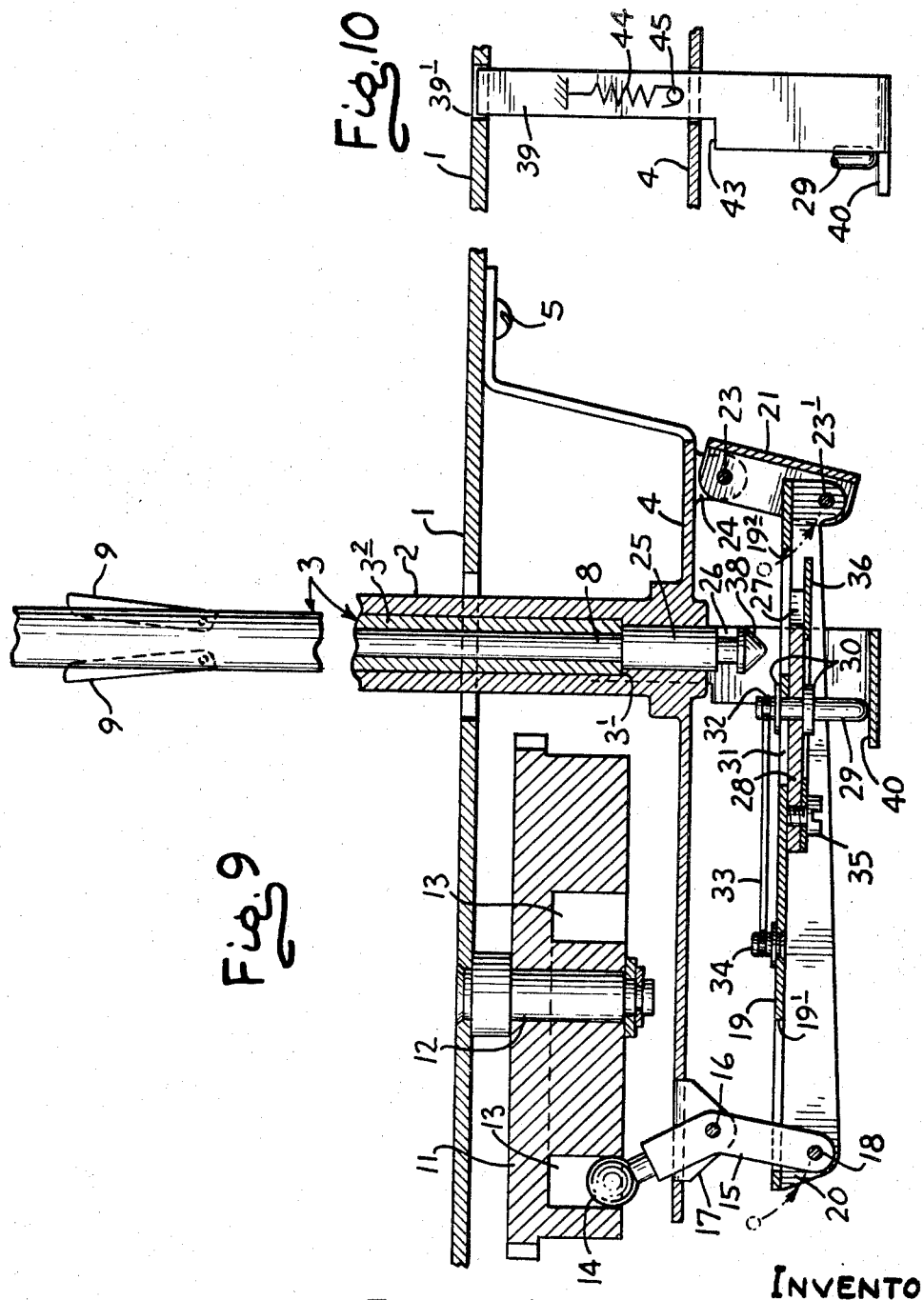

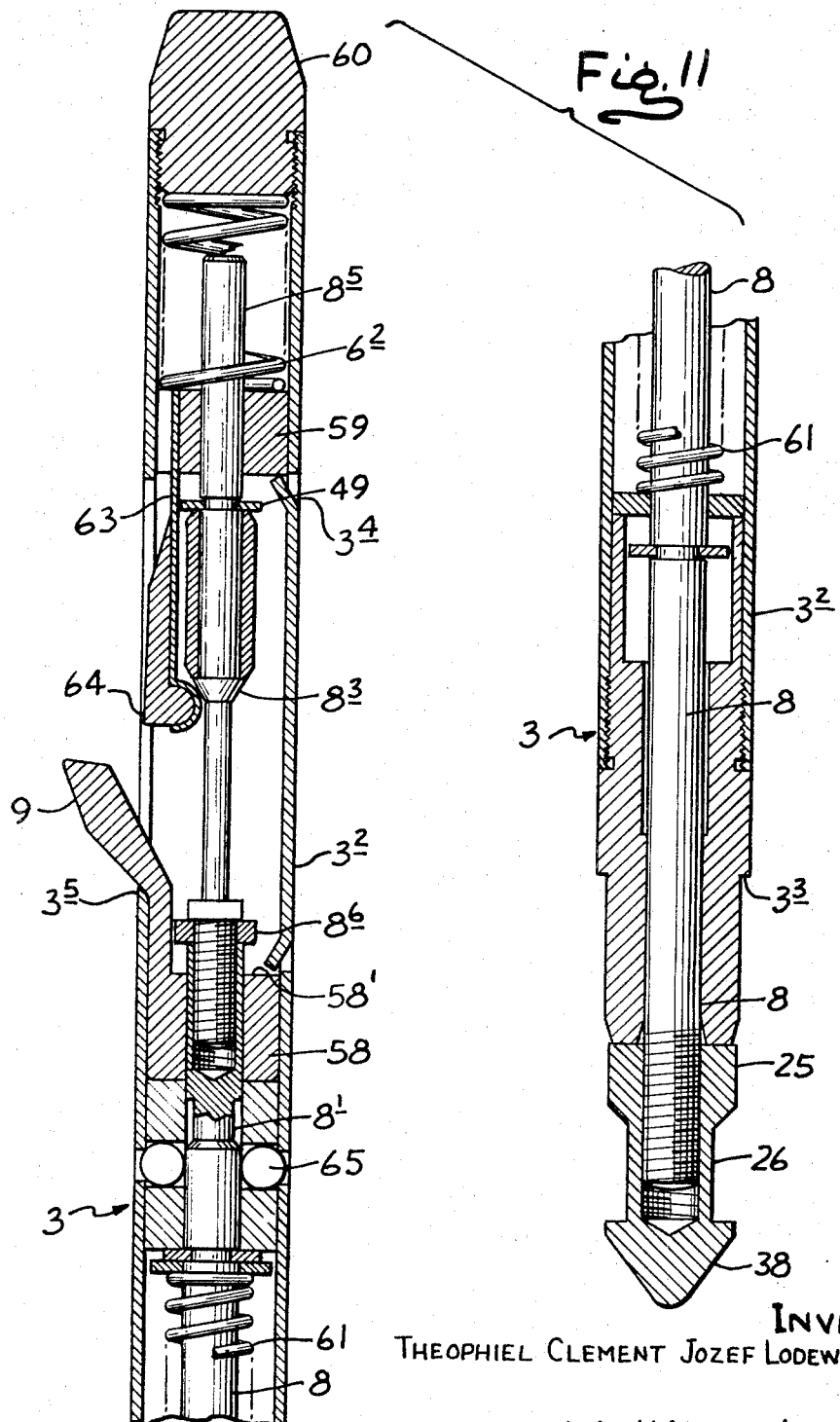

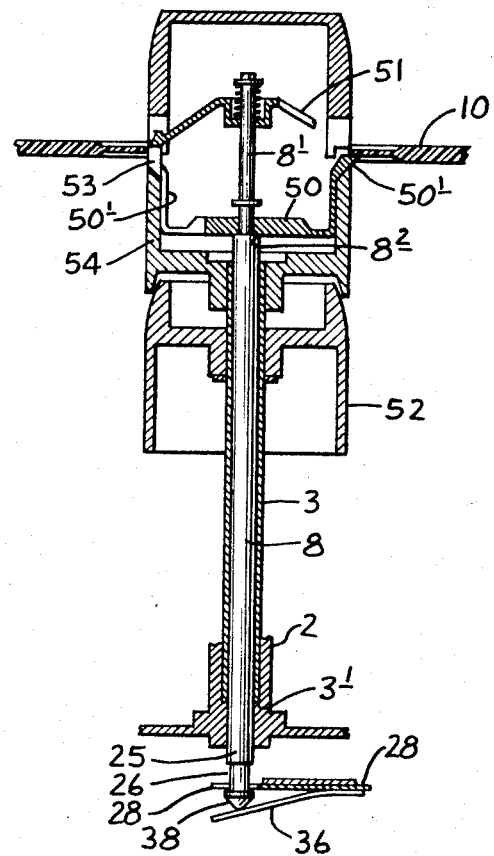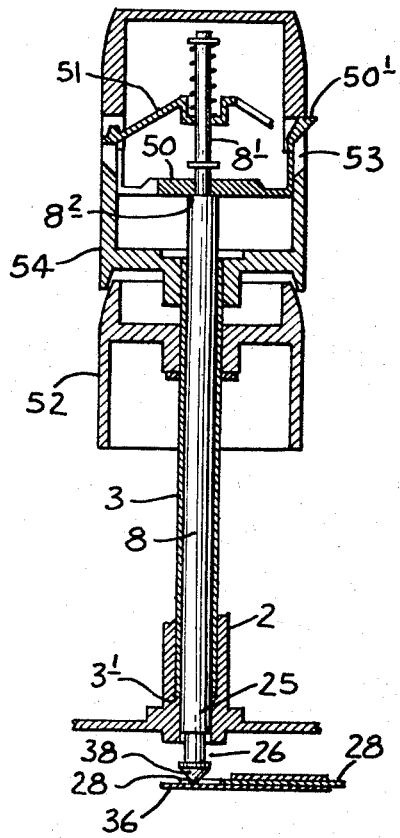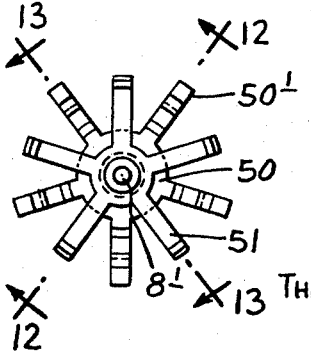

United States Patent Office 3,432,170
Patented Mar. 11, 1969

3,432,170
RECORD CHANGING APPARATUS
Theophiel Clement Jozef Lodewijk Staar, Kraainem, Belgium, assignor to Staar S.A., Brussels, Belgium, a corporation of Belgium
Filed May 18, 1966, Ser. No. 551,002
Claims priority, application Belgium, Dec. 8, 1965, 21,304
U.S. Cl. 274—10    15 Claims
Int. Cl. G11b 17/10

ABSTRACT OF THE DISCLOSURE

In a phonograph apparatus of the type having a vertical spindle adapted to support and sequentially drop records onto a turntable, an improved spindle is provided. The spindle has a retractable and extensible support operated by a control rod extending through the spindle. Both the support and the control rod are adapted to move downwardly a limited distance with respect to the phonograph apparatus in response to the weight of one or more records on the support. An actuating mechanism is provided for engaging a lower portion of the control rod, and thereby retract the support, when but only when the control rod has been moved into a limited downward position in response to the weight of a record on the support. The spindle advantageously includes a structure for retaining records above the lowermost record when the latter is dropped onto the turntable.

The present invention relates to phonograph apparatus, and more particularly to such apparatus which operates automatically to feed records sequentially from a vertical spindle onto a turntable. In further particulars, the invention provides an automatic mechanism for sequentially loading records onto a turntable from a distributor spindle and for automatically terminating operation of the phonograph apparatus after the last record has been played.

In the usual phonograph or record player mechanism provided with an automatic record changer, means such as a leveling arm which rests over the topmost record on a stack is used to indicate the presence or absence of records in the stack. Thus, after the last record in the stack has dropped onto the turntable, the leveling arm drops to a position that indicates to the record change mechanism that there is no longer a record in the stack. This conditions the mechanism to return the tone arm to rest after the last record has played, and to switch off the mechanism thereafter. The leveling arm type of device for indicating the presence or absence of records in a stack is quite inconvenient. It is necessary to remove the leveling arm from the stack in order to add, remove, or replace records. It is, furthermore, a separate mechanism and involves a support for the leveling arm which is ordinarily a post carried on the record player base adjacent the turntable and involves substantial mechanism which represents an increased cost in the manufacture of the record player unit.

Apparatus is known in which the means for indicating the presence or absence of records in a stack is contained within the spindle itself. While in principle this avoids the need for a separate leveling arm, apparatus of the foregoing type requires careful construction and assembly, and is frequently difficult to service.

It is accordingly an objective of the invention to provide an improved apparatus for indicating the presence or absence of records in a stack, which apparatus is responsive to the weight of one or more records remaining in the stack. A related objective is to provide such apparatus which is contained within the record-carrying spindle and which therefore does not require a leveling arm type of indicator.

Another object is to provide an automatic record changer apparatus capable of sequentially loading records onto a turntable and of terminating operation of the phonograph apparatus after playing the last record, which termination is caused by the absence of weight on the stack.

Another object is to provide a record storage spindle with associated apparatus which, in response to the weight of a record on the spindle, is adapted to sequentially release records onto a turntable but, when there is no such weight, is adapted to terminate operation of the phonograph.

A further object is to provide a record storage spindle having a record-releasing element which is moveable downwardly a limited distance in response to the weight of a record and a further distance in response to an activating mechanism, the activating mechanism engaging the element to release a record only when the element is in a limited downward position. Related to the foregoing, another object is to provide a phonograph-terminating device that is activated by the activating mechanism when the latter does not engage the record-releasing element.

Yet another object is to provide a plurality of spindles, operating as aforesaid, to accommodate records of different hole sizes, which spindles can be interchanged when desiring to play such different records.

Other objects and advantages of the invention will become apparent as the following description proceeds, taken in conjunction with the accompanying drawings, in which:

FIGURE 1 is an enlarged sectional elevation, partly shown schematically, of an embodiment of the invention, the position of FIG. 1 being that corresponding to the apparatus when a stack of at least one record is on the phonograph spindle;

FIG. 2 is a fragmentary side view corresponding to FIG. 1;

FIG. 3 is a bottom view of the apparatus of FIG. 1 corresponding to the same position of a record on the spindle;

FIG. 4 is a fragmentary sectional view, taken along plane 4—4 of FIG. 3;

FIG. 5 is an enlarged sectional elevation of the apparatus of FIG. 1, in this view corresponding to the position of the apparatus when a record is being dropped from the spindle onto a turntable;

FIG. 6 is a side view corresponding to the apparatus and position of FIG. 5;

FIG. 7 is another enlarged sectional elevation of the FIG. 1 apparatus, in this view showing the apparatus corresponding to the absence of any record on the spindle;

FIG. 8 is a side view corresponding to FIG. 7;

FIG. 9 is again an enlarged sectional elevation of the FIG. 1 apparatus, in this view showing the position corresponding to no record on the spindle and the automatic record changer terminating operation of the phonograph;

FIG. 10 is a side view corresponding to FIG. 9;

FIG. 11 is a greatly enlarged sectional view of one form of a spindle according to the invention, which spindle is used for standard 33⅓ and 78 r.p.m. records; and comprises a detailed view of the spindle shown somewhat diagrammatically in FIGS. 1–10;

FIG. 12 is an enlarged sectional elevation of a spindle according to the invention for use with 45 r.p.m. records, the position of the spindle shown in FIG. 12 corresponding to its position with one or more records on the spindle;

FIG. 13 is another sectional view of the spindle of

FIG. 12, in this figure showing the position with no records on the spindle;

FIG. 14 is a fragmentary top view of the spindle of FIGS. 12, 13 showing the arrangement of devices for supporting a stack of records and for sequentially releasing the records; and FIG. 15 is a fragmentary side view taken along line 15—15 of FIG. 7.

While the invention is susceptible of various modifications and alternative forms, specific embodiments thereof have been shown by way of example in the drawings and will herein be described in detail. It should be understood, however, that it is not intended to limit the invention to the particular forms disclosed, but, on the contrary, the invention is to cover all modifications, equivalents and alternatives falling within the spirit and scope of the invention as expressed in the appended claims.

Turning first to FIG. 1, there is illustrated in this figure a record changer apparatus having a frame base 1 and a removable spindle 3 carried by the frame for supporting one or more records in a stack, the spindle 3 havings arms 9 which are retractable into the spindle 3 so as to drop the lowermost record from the stack onto a turntable, not shown.

According to the present invention, operation of the phonograph apparatus is terminated automatically after the last record has been dropped from the stack. In carrying out the invention, the mechanism for supporting the stack of records and for terminating the phonograph operation includes a control rod or element 8 housed completely within the spindle 3 and extending below the phonograph turntable. In keeping with the invention, the control element 8 within the spindle 3 has a limited downward movement in response to the weight of a record, and a further downward movement produced by a cam 11 during the record change cycle to retract the record supporting arms 9 within the spindle 3 and thereby drop a record from the stack, such further movement of the control element 8 occurring only if the limited movement first takes place. Also according to the invention the same cam 11 which operates the record supporting arms 9 also drives the phonograph switch actuating mechanism which is blocked from carrying out its switch actuating function when the control element 8 is in its limited downward position in response to the weight of a record, but which is allowed to carry out its switch actuating function with the control element 8 in its raised position indicating no records in the stack thereby turning the phonograph apparatus off.

Although not shown in the figures, it will be understood that the spindle 3 is disposed coaxial of a turntable, driven by a mechanism likewise omitted for reasons of clarity. The turntable is rotatable about the hollow turntable support column or shaft 2, which is received in a conventional journal and thrust bearing disposed in the bottom of the turntable. An illustrative apparatus capable of retaining on the spindle 3 the superimposed records while the lowermost record 10 is dropped onto a turntable is exemplified, in two different forms, in FIG. 11 one the one hand in FIGS. 12, 13, 14 on the other.

In the preferred embodiment of the invention shown in FIGS. 1–11, the spindle 3 is bodily movable within the support column or shaft 2, where it is capable of moving downwardly a limited distance and resting on shoulder 3' when one or more records 10 are carried on the spindle resting atop record-retaining arms 9. In keeping with the invention, after the last record has been dropped from the spindle, the spindle 3 is resiliently urged upward by a leaf spring 36 so that it is supported above the shoulder 3' and in that position is clear of the switch actuating mechanism allowing the mechanism to complete its function to turn the phonograph off.

During the record change cycle, for releasing the lowermost record 10 in a stack carried by the spindle, a control rod 8 slidably received within spindle sleeve $3^2$ is provided for operating the record support arms 9 to cause them to retract or extend into spindle $3^2$, for causing reciprocally vertical movement of the control rod 8 with respect to the support column 2 which retracts and extends the record supporting arms 9. At its lower portion the control rod 8 is affixed to an enlargement 25 which extends through and beyond spindle 3 and into potentially operative engagement with the actuating plate 19.

Thus, the entire spindle assembly $3^2$ of the sleeve 3' and the control rod 8 (together with its enlargement 25 and lower conical head 38) is slidably insertable into, and removable from, the hollow turntable support column or shaft 2. Accordingly, different spindles may readily be substituted, one for the other, or a spindle without a separate control rod 8 may be inserted when desiring to play the phonograph in a manual mode, that is, without automatic record changing, As shown in FIG. 1, the hollow turntable support column or shaft 2 is an integral part of the turntable base or support plate 4, which is mounted below the turntable base or chassis 1. As best shown in FIG. 3, which is a bottom view of the apparatus of FIG. 1, the turntable base or support plate 4 is of generally cruciform shape, with its three shorter arms threadably connected to the turntable base or chassis 1 via the screws 5, 6, 7.

Reverting to FIG. 1, it is seen that the central portion and the long arm of turntable base or support plate 4 are carried below the turntable chassis 1 a sufficient distance to accommodate an actuating cam 11 for the actuating plate 19. One cycle of the cam 11 operates the control rod 8 of the spindle via a slotted driving plate 28 carried by the actuating plate 19 to drop a record from the stack onto the turntable. With no record on the spindle, the control rod 8 of the spindle is lifted bodily upward by means herein shown as a leaf spring 36 to a position clear of the slotted driving plate such that the cam 11 moves the driving plate past the central rod to operate a switch mechanism for the phonograph motor. To support the actuating plate 19 for both lateral and vertical movement the plate is carried by a pair of swing plates 15, 21 forming a parallelogram linkage between the actuating plate 19 and the turntable base 4. To support the swing plates 15, 21 the turntable base or support plate 4 is provided with a pair of projections or bosses 17 at the extremity of the long arm of turntable base or support plate 4, and with a similar pair of projections or bosses 24 on the opposite shorter arm. The bosses 17, 24 are respectively provided with pins 16, 23, to permit swingable attachment of swing plates 15, 21. These plates 15, 21 are likewise journalled, respectively, via pins 18, 23', fitted into a corresponding set of four holes in flange 20 of the movable actuating plate 19.

In the embodiment here shown, the distance between the pins 16 and 18 of one swing plate 15 is equal to the distance between pins 23 and 23' of the other swing plate 21; similarly, the distance between pins 16 and 23 attached to the turntable base 4 is the same as that between pins 18 and 23' attached to the actuating plate 19. Accordingly, the movable actuating plate is capable of movement in a parallelogram manner, that is, it remains parallel to the turntable base or support plate 4 while it moves downward as swing plates 15 and 23 swing back and forth.

Thus, with records on the spindle, the lateral and downward movement of the actuating plate 19 is utilized to reciprocate the control rod 8 of the spindle 3 vertically to carry out the record dropping operation during the record change cycle.

In order to move the actuating plate 19 by the cam 11, one swing plate 15 is extended at its upper extremity and terminates in a spherical cam follower 14, which may be a rotatable ball. This cam follower 14 is received in a cam profile groove 13 in the actuating cam 11, which is herein shown as a circular plate or disc which rotates about shaft 12 and is driven by a motor and gear train, not shown, actuated when the tone arm (also not shown) reaches its extreme inward position corresponding to the conclusion of a phonograph record.

As best shown in FIG. 3, the cam profile groove 13 is an eccentric circle which, as cam 11 rotates, causes the spherical cam follower 14 to move continuously and gradually from an extreme inward position (FIG. 1) to an extreme outward position (FIG. 5) and then back to its extreme inward position (FIG. 1). Correspondingly, when the cam follower 14 is in the position of FIG. 1, the movable actuating plate 19 is in its extreme upward and left-most position (FIG. 1), whereas when the cam follower 14 is in its extreme outward position (FIG. 5) the movable actuating plate 19 is in its extreme lower and right-most position (FIG. 5).

The motion of the actuating plate 19 produced by the cam 11 is transferred to the control rod 8 by means of the driving plate 28 which is supported for sliding movement on the actuating plate 19. To support the driving plate 19, as shown in FIGS. 1, 3, 4, 10 and 15, the movable actuating plate 19 is an elongated flat plate, bent downward at each of its long sides to form a pair of flanges 20. A series of slots are cut into movable actuating plate 19, including a first slot 19′, at the left of FIG. 1, which is a recess to permit movement of the swing plate 15 as it moves in response to the motion of the cam follower 14. The slot 31 is a spindle guide slot that permits guided and resiliently slidable movement of a spindle 30 longitudinally with respect to the movable actuating plate 19.

As shown in FIGS. 1 and 7, the pin 29 of the spindle 30 is the element of the actuating mechanism which engages the phonograph switch mechanism when no record is on the spindle. For this purpose spindle 30 is carried downward by the motion of the actuating plate 19 into engagement with the phonograph switch mechanism. When, on the other hand, records remain in the stack, the motion of the spindle 30 is limited in a lateral direction so that its downward motion is not transmitted to operate the switch mechanism.

The spindle 30 is attached to the driving plate 28 and the actuating plate 19 and holds them in assembled relation by means of upper and lower flanges, the former of which rests on top of the upper surface of the movable actuating plate 19 (see FIG. 4) and the bottom of which contacts the lower surface of the slotted driving plate 28. The upper extremity of spindle 30 is provided with a peripheral groove 32 (FIGS. 1 and 4) to receive one end of a bowed wire spring 33, the other end of which engages a similar peripheral groove in a lug 34 affixed to the movable actuating plate 19. Inasmuch as spring 33 is compressed inwardly, it resiliently urges spindle 30 away from the lug 34 and thus tends to urge the slotted driving plate relative to the actuating plate and towards the record supporting spindle 3.

The third slot 19² in movable actuating plate 19, shown at the right of FIG. 1, is a recess which permits the movable actuating plate 19 to swing throughout its entire range without contacting enlargement 25, peripheral groove 26, or concial end or head 38 of the control rod 8.

Engagement of the control rod 8 by components of the actuating mechanism producing its reciprocal motion is caused by the slotted driving plate 28, shown in a sectional elevation at FIG. 1 and in end views in FIGS. 4, 10 and 15. This slotted driving plate 28 is an elongated flat plate adapted to slide along the bottom surface of the movable actuating plate 19 in a path defined by the flanges 20 of the movable actuating plate. The spindle 30, as before stated, is received by the slotted driving plate 28 and rides in a spindle guide slot 31 within the movable actuating plate 19; accordingly, the slotted driving plate 28 can move longitudinally with respect to the movable actuating plate 19 along limits defined by the spindle guide slot 31, and is normally urged away from the lug 34 by reason of the bowed wire spring 33.

As best shown in FIG. 3, the slotted driving plate 28 is provided with a V-shaped notch or slot 27 which is adapted to operatively and physically engage the peripheral groove 26 (FIG. 1) at the lower portion of the control rod 8, when the rod is held in its limited downward position by the weight of a record on the spindle. Upon engagement by the driving plate 28, the control rod 8 is moved further downward by the further movement of the driving plate, to retract the record supporting arm in the spindle and thereby drop the lowermost record from the stack. The control rod 8 is maintained in its limited downward position by the weight of a record which overcomes an upward force exerted on the control rod 8 by a leaf spring 36 which operates as a cantilever, and is affixed at one end to the left-hand portion (FIG. 1) of slotted driving plate 28 via a screw 35. A central portion or slot 37 is cut away (FIGS. 3 and 4) to permit independent movement of the leaf spring 36 with respect to the depending spindle 30.

The leaf spring 36 is comparatively weak, and is so designed and proportioned as to be bent into the position shown in FIG. 1 when a single record 10 is placed onto the arms 9, but to elevate spindle 3, including control rod 8 and its extending enlargement 25 and head 38, into the elevated or upward position shown in FIG. 7 when there is no record on the arms 9. Otherwise stated, the effect of spring 36 is to provide a resilient balance against the weight of one record 10 and the spindle assembly, the spring 36 being able to lift the spindle assembly alone but not the spindle assembly with one or more records thereon. The effect of the leaf spring raising the control element 8 is to allow the slotted driving plate 28 to move past the lower end of the control element and, in the course of such movement, to carry the pin 29 of the spindle 30 which extends below the driving plate 28 into engagement with a phonograph switch actuator. This switch actuator, as shown in FIGS. 1, 2, and 10, taken in conjunction with each other, is formed of a generally U-shaped bracket having vertically extending arms 39 and a horizontal projecting cross piece 40. The actuator is positioned slidably below and on both sides of the hollow turntable support column or shaft 2. The actuator arms 39 are free to slide through a pair of guide slots 39′ in the turntable chassis 1, and through a corresponding pair of guide slots in the turntable support plate 4. The upper portions of the switch actuator arms 39, as shown in FIGS. 2 and 10, extend upwardly above the level of turntable chassis 1 and are identified as ends 41, 42.

As best shown in FIG. 2, the switch actuator arms 39 are each provided with a lug or shoulder 43 which permits the assembly of arms 39 and projecting crosspiece 40 to move upwardly only so far as shown in FIG. 2. A light coil spring 44 connected via the spindle 45 on each arm 30 of the U-shaped assembly urges the assembly in an upward direction.

Not shown in FIG. 2 and omitted for clarity is an electrical switch connected to the assembly of arms 39 and projecting crosspiece 40. When the assembly is in the position shown in FIG. 2 this switch is closed, permitting electrical power to be transmitted to the motor and drive train (not shown) which operate the turntable, the cam 11, and the tone arm (not shown). However when the actuator assembly is in a retracted position (FIG. 10) the switch is opened, which terminates power to the motor.

The sequence of operation of the preferred embodiment depicted in FIGS. 1 through 10 will now be discussed.

Initially, with no record resting on the arm 9 of the spindle 3, the components of the apparatus will assume the position shown in FIG. 7. It will be observed that the leaf spring 36, bearing upwards against the conical end or head 38 of the control rod 8, has urged the entire spindle assembly in a fully extended or upward position with respect to the hollow turntable support column or shaft 2. Also, the cam 11 is so disposed that its cam profile groove 13 leaves the cam follower 14 in its innermost position so that the toggle action of the swing plate 15 locates the movable actuating plate 19 in its uppermost and left-most position. In the position of the mechanism shown in FIG. 7, the movable actuating plate 19 is sufficiently far to the left that even though the slotted driving plate 28 is maintained by the spring 33 at its extreme right position (as determined by spindle guide slot 31) the V-shaped notch 27 is retracted away from the conical end or head 38 of the spindle assembly. This is the position of the mechanism shown in FIG. 3.

When one or more records are stacked on the spindle 3, the weight of the records 10 resting on the fingers or arms 9 causes the entire spindle assembly to move downward into the partially lowered or retracted position of FIG. 1. The weight of a record 10 pushes down on the control rod 8 and overcomes the force of the leaf spring 36 causing the leaf spring 36 to bend downward as shown in FIG. 1. The limit of such movement is defined by the location of shoulder 3' against the bottom portion defined in the lower section of the spindle sleeve $3^2$ to prohibit further movement of the spindle 3.

Upon the initiation of a record change cycle, with one or more records stacked on the spindle, as shown in FIG. 1, the mechanism operates to drop the lowermost record onto the turntable, and after the last record has been dropped, to operate the phonograph switch mechanism. Considering first the record dropping operations, the cam 11 is caused to revolve during the record change cycle to carry the various components through their motions. Thus, via the swing plate 15 the cam 11 moves the actuator plate 19 to the right in FIG. 1 toward the spindle 3, carrying the driving plate 28 toward the spindle. Referring also to FIG. 5, with the spindle in the down position the peripheral groove 26 at the lower end of the control rod 8 is aligned with the driving plate 28 such that upon movement of the slotted driving plate 28 to the right toward the control rod 8, the base of the V-shaped notch 27 in the driving plate physically and operatively engages the control rod in its reduced section 26 such that the enlarged conical end or head 38 of the rod 8 is below the driving plate as shown in FIG. 5. Thus the lateral and downward movement of the slotted driving plate 28 produced by the toggle action of the arm 15 from the cam 11 and the parallelogram linkage of the arms 15 and 21 pulls the control rod 8 downwardly.

The record change cycle occurs, of course, after a record has been played, the tone arm has returned (or is being returned) to a pre-play position, and rotation of the actuating cam 11 is commenced.

As the cam 11 completes one revolution, the parts are returned to the position shown in FIG. 1. Assuming at least one record was on the spindle before the record change cycle began, the phonograph switch mechanism will not be actuated in the course of that record change cycle so that the turntable motor will continue to operate to play the record which was dropped onto the turntable in the course of that cycle. Thus as shown in FIG. 1 in phantom, the depending pin 29 of the spindle 30 moves into positions $29^1$, $29^2$, $29^3$ as the driving plate 28 moves laterally and downwardly during the record change cycle, but by reason of the engagement of the slotted driving plate 28 with the control rod 8, the movement to the right of the depending pin 29 of the spindle 30 stops short of the projecting crosspiece 40 on the actuator 39 and, consequently, does not move these arms 39 to turn off the apparatus.

Referring to FIG. 5 and also to FIG. 11, when the cam driving mechanisms have reached the position shown in FIG. 5, the control rod 8 has been moved downwardly with respect to the spindle 3 (and also with respect to the hollow turntable support column or shaft 2). Such downward movement of the control rod 8 retracts the record support arms 9 inwardly into the spindle 3, and permits a record 10 to slide or drop along the spindle onto the turntable. This downward movement of the control rod 8 also serves to retain those records above the lowermost record 10 on the spindle before arms 9 are fully retracted so as to permit one and only one record to descend down the spindle 3.

When the apparatus has reached its position shown in FIG. 5, the control rod 8 has been moved downward with respect to both the spindle 3 and the hollow turntable support column or shaft 2. Accordingly, the record-support arms 9 are fully retracted and, as stated before, permit the lowermost record 10 to fall from the stack of records onto thee turntable. However at this phase of the operating cycle, the actuating cam 11 continues to rotate and thereby causes the apparatus to return to its position of FIG. 1. This has the effect of returning the control rod 8 upward until the enlargement 25 engages the lower portion of the sleeve $3^2$, that is, at the level of shoulder $3^1$. In this position the record retaining arms 9 are again extended and are able to support the lowermost record 10.

Two additional operations occur in the foregoing cycle between the position of FIG. 1 to the position of FIG. 5 and then back to FIG. 1. Firstly, inasmuch as the slotted driving plate 28 is prevented from moving past its position of engagement with peripheral groove 26 in the lower portion of the control rod 8, the depending pin 29 of the spindle 30 is prevented from engaging and activating the projecting crosspiece 40 which would turn off the phonograph apparatus. Thus the phonograph apparatus remains in operation and is permitted to play the record that has just dropped onto the turntable.

The second operation which occurs in the cycle from FIG. 1 to FIG. 5 and back to FIG. 1 is that an expanding collet carried by the spindle 3 is activated when the control rod 8 is moved downward (from the position of FIG. 1 to that of FIG. 5) with respect to the spindle 3 to engage those records above the lowermost record 10 to prevent such records from dropping down onto the turntable. For this purpose, referring to FIG. 11, the upper portion of the spindle 3 includes one or more plastic arms 64 which form an expanding collet. The arms 64 are suspended by flat springs 63 from a sleeve 59 through which the control rod 8 is slidable, and which is urged by a spring 62 against a shoulder 34, such that downward movement of the control rod via the bevelled camming surface $8^3$ swings the arms outwardly of the spindle to engage the edges of the center-holes in records carried on the spindle above the lowermost record. After the records in the stack have been so engaged by the collet arms 64 the record support arms 9 are retracted to drop the lowermost record. To retract the support arms 9 upon downward movement of the control rod, a flange 86 on the top of the control rod 8 engages the upper surface 58' of sleeve 58 to which the lower ends of the support arms 9 are integrally joined. In this case the arms 9 and the sleeve 58 are formed as a single member of hard, resilient material such as polyethylene. The control rod 8 upon downward movement thus draws the support arms 9 into the spindle, camming them over the edge 35 of slots in the spindle sleeve $3^2$ so that they disappear in the recess within the spindle, removing all support from under the lowermost record 10 and allowing it to drop. To insure that the collet arms 64 extend and the record arms 9 retract in sequence, the balls 65 block downward movement of the integral sleeve 58 and arms 9 until the reduced section 8' of the control rod 8 is moved down opposite the balls, loosening the balls and allowing the sleeve 58 to be pulled down. After the record has dropped, during the remaining portion of the revolution of the cam 11, the control rod will be raised by the action of the return spring 61 within the spindle from the position of FIG. 5 to the position of FIGS. 1 and 11 thereby retracting the collett arms 64 and extending the record support arms 9 to support any records in the stack.

The foregoing cycle is followed when, but only when, there is at least one record 10 on retaining the arms 9. This condition, as before noted, lowers or retracts the control rod 8 into the position shown in FIG. 1 where it is engaged by the sideward and downward motion of the slotted driving plate 28. However, should there be no such record carried by the retaining arms 9, the control rod 8 and spindle 3 will be elevated by the resilient action of the leaf spring 36 into the position shown in FIG. 7.

Inviting attention to FIG. 7, it will be observed that with no record on the spindle, the leaf spring 36 is substantially flat rather than bent (as in FIG. 1), and, consequently, control rod 8 is elevated (with reference to its position of FIG. 1). So also is the spindle sleeve $3^2$ raised from its resting position on shoulder 3'. (Since control rod 8 is not extended in relation to sleeve 3, the record retaining arms 9 are in an extended position as shown in FIG. 7; however, because no record is on these arms, their position is immaterial.)

When the record tone arm has completed playing the last record and is being returned to its position away from the turntable, the cam 11 of FIG. 7 is again activated and commences rotating from its position shown in FIG. 7 to that of FIG. 9. Since however the upper surface of the conical head 38 of the control rod 8 is above the level of the slotted driving plate 28, the base of the V-notch 27 does not engage the control rod 8. Consequently, as the movable actuating plate 19 is swung downward and to the right (from the position of FIG. 7 to that of FIG. 9), the movable actuating plate 19 and the slotted driving plate 28 move past the control rod 8 without engaging the rod to pull it down. The initial position of the movable actuating plate 19 and its associated slotted driving plate 28 is shown in FIG. 7, while the final position is shown in FIG. 9.

Moreover, one of the features of the invention is the actuation from the cam 11 of the phonograph switch mechanism to terminate operation of the phonograph apparatus when the last record has been played. To this end, the depending pin 29 of the spindle 30 which projects beneath the slotted driving plate 28 moves along the path shown in phantom in FIG. 7 toward the final position shown in FIG. 9, where it engages the projecting crosspiece 40 to cause a switch associated with the switch arms 39 (FIGS. 8 and 10) to initiate termination of the phonograph apparatus (FIG. 7). Since the slotted driving plate 28 is not restricted from further sidewise movement (i.e., no engagement with the control rod 8), the movable actuating plate 19 moves sidewards and downwards from the position of FIG. 7 to that of FIG. 9.

It is preferred that after actuation of the phonograph switch, the cam 11 will continue to be rotated to complete its cycle and returned to the position of FIG. 7. After the apparatus of the invention is returned to the position shown in FIG. 7 it is ready to receive additional records, or those records already on the turntable may be lifted off, or both.

Turning now to FIGS. 12-14, it is observed that these figures depict a form of spindle 3 suitable for 45 r.p.m. records which have a substantially larger central hole. Moreover, the spindle mechanism of these figures is so constructed and arranged that the spindle sleeve 3 remains immovable as records are placed onto the spindle assembly, and only the record support arms $50^1$, the record-support arm plate 50, and the control rod 8 are moved downwardly a limited distance in response to record weight.

The spindle assembly of FIGS. 12 and 13 are sectional elevation views, taken along lines 12—12 and 13—13, respectively, of FIG. 14. FIG. 14 is only a partial view, specifically a partial top view showing the five-fingered arrangement of the collet arms 51 and a similar five-fingered arrangement of the record support arms $50^1$.

Turning to FIG. 12, an upper cylinder 54 and a lower cylinder 52 are each threadably received onto the spindle sleeve 3, the bottom-most portion of the lower cylinder 52 being positioned immediately above the top surface of the phonograph turntable (not shown). The control rod 8 is slidable longitudinally of the sleeve 3, and carries affixed to the rod 8 the cylindrical disc 50 to which are attached the record support arms $50^1$, which normally protrude through the corresponding apertures 53 in the walls of the upper cylinder 54. An upper portion $8^1$ of the control rod 8 is attached to the collet arms 51, which similarly extend through matching apertures in the walls of the upper cylinder 54.

With no record on the 45 r.p.m. spindle, the assembly is in the position shown in FIG. 13. Thus, the control rod 8 is raised by the spring action of the leaf spring 36 engaging the conical head 38. Accordingly, the record support arms $50^1$, are in an elevated position with respect to the spindle assembly.

It will also be observed that, in the embodiments of FIGS. 12 and 13, the sleeve 3 is immovable, and in contrast to the spindle of FIG. 11 (and as described earlier in conjunction with FIGS. 1-10) is not reciprocated in the hollow turntable support column or shaft 2. By the same token, the upper cylinder 54 and the lower cylinder 52 remain immovable irrespective of whether records are placed atop record support arms $50^1$.

As soon as least one record is placed onto the spindle assembly, the record support arms $50^1$ are lowered by a limited amount (shown in FIG. 12) resulting from the weight of the record 10 depressing the leaf spring 36. Further movement is restricted by the frictional action of the record support arms $50^1$ against the lower surfaces of the apertures 53. When, however, the control rod 8 is pulled down (by operation of the actuating mechanism of FIG. 1), the control rod 8 draws the record support arms $50^1$ down so as to cam them against the aforesaid cam surfaces, thereby retracting the record support arms $50^1$ so that they disappear into the hollow center of the upper cylinders 54 and permit the lowermost record 10 to descend onto the turntable. As in the case of the spindle described in FIG. 11, lowering of the control rod 8 first actuates the collet arms 51 to engage the next record above the lowermost record and thereby support the records in the stack before and while the lowermost record is being dropped onto the turntable. In all other respects the operation of the spindle shown in FIGS. 12-14 parallels that of the spindle of FIG. 11, and the operating cycles for the two (i.e., FIGS. 1-10) are identical. In the case of the spindle of FIGS. 12 and 13, as in the case of the FIG. 11 spindle, records already on the turntable may be lifted up past the record support arms which will be moved inwardly upon engagement by the records to allow the records to slip past.

I claim as my invention:

1. In a phonograph apparatus of the type having a vertical spindle adapted to support and sequentially drop records onto a turntable, the improvement comprising:
   (1) retractable support means carried by said spindle for supporting a stack of records,
   (2) a vertically moveable control rod extending through said spindle and operable to retract and extend said support means, at least said support means and said control rod being movable downwardly a limited distance with respect to said phonograph apparatus in response to the weight of a record on said support means,
   (3) means for limiting the downward movement of said control rod, and
   (4) actuating means for operatively engaging a lower portion of said control rod to thereby move said control rod downwardly with respect to said spindle and thereby retract said support means, said actuating means operatively engaging said lower portion only when said control rod has been moved into a limited downward position in response to the weight of a record on said support means.

2. Apparatus of claim 1 including spring means urging said support means and said control rod upwardly into a normally upward position in the absence of a record on said support means.

3. Apparatus of claim 1 including means carried by said spindle for retaining records above the lowermost record on said spindle, said means being activated by said control rod when said control rod is moved downwardly with respect to said spindle and before said support means is fully retracted.

4. Apparatus of claim 1 wherein said spindle, together with said support means and said control rod, is moved downwardly in response to the weight of a record on said support means.

5. Apparatus of claim 1 wherein said spindle is immovable downwardly, and only said support means and said control rod are moved downwardly in response to the weight of a record on said support means.

6. Apparatus of claim 1 including spring means urging said support means and said control rod upwardly into a normally upward position in the absence of a record on said support means, and means responsive to the movement of said actuating means for terminating operation of said phonograph apparatus when said actuating means moves to operatively engage said control rod but when said control rod has not been moved into a limited downward position by the weight of a record on said support means.

7. Apparatus of claim 1 wherein said actuating means include an actuating plate movable in a parallelogram manner toward and downwardly of said control rod, a portion of said actuating plate being adapted to engage said control rod for further downward movement.

8. Apparatus of claim 7 wherein said portion is resiliently slidable longitudinally of said actuating plate to permit said portion to move said control rod downward by continued parallelogram movement after engagement of said portion with said control rod.

9. Apparatus of claim 7 wherein said actuating plate is driven in response to an eccentric rotating cam.

10. A removable spindle for an automatic phonograph apparatus comprising:
(1) a spindle sleeve,
(2) retractable support means carried by said spindle sleeve for supporting a stack of records, and
(3) a vertically moveable control rod extending through said spindle sleeve and operable to retract and extend said support means, at least said support means and said control rod being movable downward with respect to said phonograph apparatus a limited distance in response to the weight of a record on said support means,
(3a) said automatic phonograph apparatus having means for limiting the downward movement of said control rod, and
(3b) said control rod having a lower portion protruding axially of said spindle sleeve an adapted for operative engagement with a control-rod actuating mechanism to lower said control rod with respect to said sleeve and thereby retract said support means.

11. Spindle of claim 10 including means carried by said spindle for retaining records above the lowermost record on said spindle, said means being activated when said control rod is moved downwardly with respect to said spindle and before said support means is fully retracted.

12. Spindle of claim 10 wherein said spindle, together with said support means and said control rod, is moved downwardly in response to the weight of a record on said support means.

13. Spindle of claim 10 wherein said spindle is immovable downwardly, and only said support means and said control rod are moved downwardly in response to the weight of a record on said support means.

14. In a phonograph apparatus having
(a) a spindle adapted to support and sequentially drop records onto a turntable,
(b) retractable support means carried by said spindle for supporting a stack of records, and
(c) a vertically moveable control rod extending through said spindle and operable to retract and extend said support means the improved combination therewith comprising:
(1) spring means urging said support means and said control rod upwardly into a normally upward position in the absence of a record on said support means, at least said support means and said control rod being movable downwardly a limited distance with respect to said phonograph apparatus in response to the weight of a record on said support means,
(2) means for limiting the downward movement of said control rod, and
(3) actuating means for operatively engaging a lower portion of said control rod to thereby move said control rod downwardly with respect to said spindle and thereby retract said support means, said actuating means operatively engaging said lower portion only when said control rod has been moved into a limited downward position in response to the weight of a record on said support means.

15. In a phonograph apparatus of the type having
(a) a vertical spindle adapted to support and sequentially drop records onto a turntable,
(b) retractable support means carried by said spindle for supporting a stack of records, and
(c) a vertically moveable control rod extending through said spindle and operable to retract and extend said support means, the improvement comprising:
(1) spring means urging said support means and said control rod upwardly into a normally upward position in the absence of a record on said support means, at least said support means and said control rod being movable downwardly a limited distance in response to the weight of a record on said support means,
(2) means for limiting the downward movement of said control rod,
(3) means for terminating operation of said phonograph apparatus, and
(4) actuating means
(i) for operatively engaging a lower portion of said control rod when said control rod has been moved into a limited downward position, to thereby move said control rod downwardly with respect to said spindle and thereby retract said support means, and
(ii) for operatively engaging said terminating means when said control rod has not been moved into a limited downward position, to thereby terminate operation of said phonograph apparatus.

References Cited
UNITED STATES PATENTS

| | | | |
|---|---|---|---|
| 2,657,060 | 10/1953 | Lapish | 274—10 |
| 2,707,639 | 5/1955 | Vistain | 274—10 |
| 3,012,789 | 12/1961 | Rae | 274—10 |

HARRY N. HAROIAN, *Primary Examiner.*